US 8,675,689 B2

(12) United States Patent
Bobrek et al.

(10) Patent No.: US 8,675,689 B2
(45) Date of Patent: Mar. 18, 2014

(54) METHOD OF TIME SYNCHRONIZATION OF FREE RUNNING NODES IN AN AVIONICS NETWORK

(75) Inventors: Pavlo Bobrek, Bradenton, FL (US); Jeffrey VanDorp, Kentwood, MI (US); Harry Molling, Kentwood, MI (US)

(73) Assignee: General Electric Company, Schenectady, NY (US)

( * ) Notice: Subject to any disclaimer, the term of this patent is extended or adjusted under 35 U.S.C. 154(b) by 572 days.

(21) Appl. No.: 13/027,587

(22) Filed: Feb. 15, 2011

(65) Prior Publication Data

US 2012/0207183 A1 Aug. 16, 2012

(51) Int. Cl.
*H04J 3/06* (2006.01)
(52) U.S. Cl.
USPC .......................................... 370/509; 370/511
(58) Field of Classification Search
USPC ................................. 370/509, 511
See application file for complete search history.

(56) References Cited

U.S. PATENT DOCUMENTS

| | | | |
|---|---|---|---|
| 4,569,042 A | 2/1986 | Larson | |
| 8,121,050 B2 * | 2/2012 | Liu | 370/252 |
| 8,385,744 B2 * | 2/2013 | Zhao | 398/98 |
| 8,446,896 B2 * | 5/2013 | Bedrosian | 370/350 |
| 2002/0178256 A1 | 11/2002 | Arnold et al. | |
| 2003/0177154 A1 | 9/2003 | Vrancic | |
| 2006/0062143 A1 | 3/2006 | Bibby et al. | |
| 2009/0204811 A1 * | 8/2009 | Fries et al. | 713/160 |
| 2010/0165839 A1 | 7/2010 | Senese et al. | |
| 2011/0261917 A1 * | 10/2011 | Bedrosian | 375/371 |
| 2013/0121351 A1 * | 5/2013 | Miyabe | 370/503 |
| 2013/0191486 A1 * | 7/2013 | Someya et al. | 709/208 |
| 2013/0215889 A1 * | 8/2013 | Zheng et al. | 370/390 |
| 2013/0215910 A1 * | 8/2013 | Inomata | 370/503 |

FOREIGN PATENT DOCUMENTS

| | | |
|---|---|---|
| EP | 1802015 A1 | 6/2007 |
| WO | 2010/066664 A1 | 6/2010 |

OTHER PUBLICATIONS

Search Report and Written Opinion from EP Application No. 12155406.7 Sep. 28, 2012.
Search Report and Written Opinion from corresponding EP Application No. 12155406.7, Jun. 11, 2012.

* cited by examiner

*Primary Examiner* — Farah Faroul
(74) *Attorney, Agent, or Firm* — McGarry Bair PC

(57) ABSTRACT

A method of synchronizing a local estimation of global network time of a receiving node on a network to a global network time reference is provided. The free running nodes receive precise time protocol synchronization messages and determine a ratio and an offset based on time data extracted from the messages.

16 Claims, 6 Drawing Sheets

METHOD OF TIME SYNCHRONIZATION OF FREE RUNNING NODES IN AN AVIONICS NETWORK

BACKGROUND OF THE INVENTION

The technology described herein relates to a method of synchronizing time among free-running nodes in a dual redundant network such as an avionics full-duplex switched Ethernet as described in ARINC 664, Part 7.

In an ARINC 664, Part 7 network, each End System (ES) or terminal node assumes the role of a Network Interface Controller (NIC), capable of maintaining open communication ports on one or more channels for messages written and read by multiple applications which share a host processor. In an ARINC 664, Part 7 avionics network, nodes can operate in a normal integrity mode, where the probability of undetected error is approximately less than $10^{-6}$ per flight hour. Additional functionality in the nodes is required to support a high integrity mode, where the probability of undetected error must be no greater than $10^{-9}$ per flight hour. Applications may run in a high integrity mode where it is important to assure high integrity for safety-critical data transported across the network. Such integrity checking includes validating bit integrity (e.g., using a cyclic redundancy checksum), validating source integrity (i.e., ensuring data comes from the correct source), validating temporal ordering (i.e. checking the order in which messages are sent and received), and validating age of the data (i.e. the time difference between when the message was submitted to the transmitting node and when it was retrieved from the receiving node). To validate ordinality and age, data must be accurately time stamped both when published by the source application and, when retrieved by the destination application, referring to or using the respective local time references for each node. Therefore, it is important to for all local time references of each of the ES to track each other within a specified minimum tolerance and in a manner which prevents time from regressing.

Safety critical applications which communicate over the network could use an application specific protocol to perform their own ordinal and time integrity monitoring and validation within an application. For example, the Boeing 787 Common Data Network, which was jointly developed by GE and Rockwell Collins, uses a separate management function to provide centralized monitoring and distribution of time reference and offset tables containing the relationships between individual node time references. In this architecture, each node must compute offset information and program an ASIC processing element which applies time stamps and validates ordinal and time integrity for each received message. This approach requires significant processing within each node, as well as consuming substantial network resources to provide additional low-latency communication paths between every node and the nodes which support the management function.

BRIEF DESCRIPTION OF THE INVENTION

In one aspect, a method of synchronizing a local time reference (LNT) for a receiving node on a network to an estimate of a global network time reference (GNT) of sending nodes on the network includes transmitting from each sending node redundant precise time protocol synchronization messages to establish the GNT and LNT time date for the receiving node. The receiving node selects one of the two redundant PTP messages sets time data related to the LNT corresponding to each selected PTP message. The receiving node captures GNT and LNT values for the sending node and the receiving node for each selected PTP message and determines a ratio and an offset based on the time data corresponding to each of the sending nodes. The receiving node compares the determined ratio and offset pairs using predetermined criteria, selects one of the sending nodes based on the comparison, and synchronizes the LNT to the GNT of the selected sending node.

DETAILED DESCRIPTION

Figure 1:
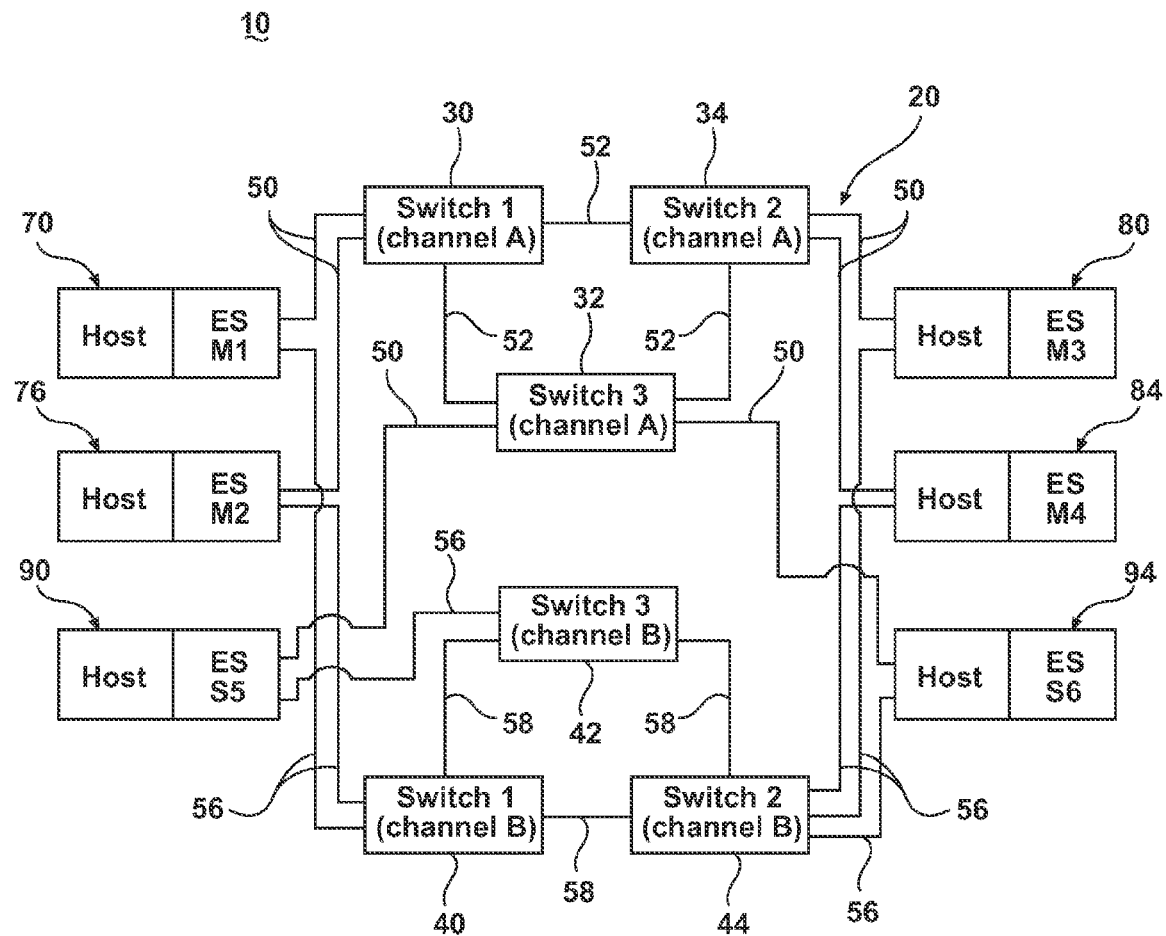
FIG. 1 is a schematic representation of a topology of an avionics communications network configured to operate according to one embodiment of the present invention.

In the following description, for the purposes of explanation, numerous specific details are set forth in order to provide a thorough understanding of the technology described herein. It will be evident to one skilled in the art, however, that the exemplary embodiments may be practiced without these specific details. In other instances, structures and device are shown in diagram form in order to facilitate description of the exemplary embodiments.

The exemplary embodiments are described below with reference to the drawings. These drawings illustrate certain details of specific embodiments that implement the module, method, and computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general purpose computer, special purpose computer, or special purpose processing machines to perform a certain function or group of functions.

Embodiments will be described in the general context of method steps that may be implemented in one embodiment by a program product including machine-executable instructions, such as program code, for example in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program code for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configuration, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

An exemplary system for implementing the overall or portions of the exemplary embodiments might include a general purpose computing device in the form of a computer, including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Technical effects of the method disclosed in the embodiments include ascertaining the integrity of data received in an avionics network aboard an aircraft. To validate ordinality and age, data must be accurately time stamped when published by the sender and when received at the destination receiver, using their respective local time references.

The present embodiment of the invention is related to synchronizing time at terminal nodes on an avionics network to a global network time maintained on at least one terminal node on the network. The synchronization process involves sending messages over the network to the terminal nodes from nodes that maintain the global network time and extracting timing information associated with the messages to synchronize local estimates of the global network time at each of the nodes to be synchronized.

Referring now to FIG. 1, the communication network 10 can have multiple terminal nodes 70, 76, 80, 84, 90, and 94. These multiple terminal nodes 70, 76, 80, 84, 90, and 94 can also be referred to as end systems (ES). Each end system 70, 76, 80, 84, 90, and 94 can be either a master end system 70, 76, 80, and 84 or a slave end system 90 and 94. The communication network 10 further comprises switches 30, 32, 34, 40, 42, and 44 for transferring data over the network 10. In this configuration, each ES 70, 76, 80, 84, 90, and 94 is connected to one of a first and second channel (channel A and B) in the network, with each switch forwarding Media Access Control (MAC) frames on one of the channels. In other words, there are channel A switches 30, 32, and 34 and channel B switches 40, 42, 44. The switches 30, 32, 34, 40, 42, and 44 and the ES 70, 76, 80, 84, 90, and 94 systems are interconnected to each other via network connections 20. The network connections 20 comprise channel A connections to ES 50 between channel A switches and each of the end systems 70, 76, 80, 84, 90, and 94, channel B connections to ES 56 between channel B switches and each of the ES 70, 76, 80, 84, 90, and 94, channel A connections between switches 52, and channel B connections between switches 58.

The switches 30, 32, 34, 40, 42, and 44 represent any known hardware and software for transferring traffic, messages, or data on a communications network 10, including, but not limited to routers and hubs. The switches 30, 32, 34, 40, 42, and 44 can further comprise electronic controllers and electronic memory (not shown) containing application software and data required for routing communication messages according to known communications protocols, such as ARINC 664, Part 7 (AFDX network), and under a variety of integrity modes, including high integrity and normal integrity modes.

The ES 70, 76, 80, 84, 90, and 94 can each comprise electronic controllers, electronic memory containing application software and data and a local reference (LR) clock (all represented as Host) required for various node functions, including at least, receiving and transmitting messages on the communications network, and verifying the integrity of received messages using methods, such as time integrity check and message sorting according to the embodiments herein, and synchronizing the local clock according to the embodiments described herein.

When time integrity checks are performed, each node 70, 76, 80, 84, 90, and 94, including master end systems 70, 76, 80, and 84 and slave end systems 90 and 94 can generate an estimate based on their local reference (LR), herein referred to as local network time (LNT) of the global network time (GNT). The master end systems 70, 76, 80, and 84 (also designated as M1, M2, M3, and M4) are further capable of transmitting clock synchronization messages or precise time protocol (PTP) messages containing time stamp information used to synchronize a receiving node 70, 76, 80, 84, 90, and 94 to a global network time (GNT). While a master end system 70, 76, 80, and 84 is capable of transmitting PTP messages on the communication network 10 for synchronizing any node 70, 76, 80, 84, 90, and 94, a master end system 70, 76, 80, and 84 can also synchronize its own clock based upon PTP messages received from other master end systems 70, 76, 80, and 84.

As a further feature, the multiple master end systems 70, 76, 80, and 84 can have a priority set to it relative to the other of the master end systems 70, 76, 80, and 84. The priority can be used to determine which master nodes are to be used and in which order for the purposes of time synchronization. For example, the master end systems 70, 76, 80, and 84 can have a priority system ascribed to it such that the time information of PTP messages from M1 70 can have a higher priority than M2 76, which in turn can have a higher priority than M3 80, which further can have a higher priority than M4 84. As an alternative, the priority can be such that M1 70 has a higher priority than M2 76, M3 80, and M4 84 and M2 76, M3 80, and M4 84 all have equal priority levels. The master node with the highest priority, for example M1 70, can be referred to as a grandmaster. In some cases, the nodes that are designated as master end systems 70, 76, 80, and 84 may have LR clocks or oscillators with greater accuracy, greater precision, greater slew rate, reduced drift with time, or a higher Q factor compared to LR clocks or oscillators in slave end systems 90 and 94. Similarly, a grandmaster node may have LR clocks or oscillators with greater accuracy, greater precision, greater slew rate, reduced drift with time, or a higher Q factor compared to LR clocks or oscillators in other master end systems 70, 76, 80, and 84 or slave end systems 90 and 94.

The PTP messages can be unidirectional, in that unlike master end systems 70, 76, 80, and 84, slave end systems 90 and 94 do not send PTP messages on the communications network 10 for the purposes of time synchronization. Slave end systems 90 and 94 can only receive PTP messages for synchronizing its own LNT based upon received PTP messages and its own local reference (LR).

The synchronization accuracy depends on an accurate estimate of the minimum PTP message latency (Dmin) between each master end system 70, 76, 80, and 84, and all receiving end systems, 70, 76, 80, 84, 90 and 94. That is, each receiving end system is configured with a unique value of Dmin for each master end system from which it receives PTP messages. For example, an avionics network topology is fixed by design so that an accurate estimate of Dmin values can be obtained in a laboratory environment, when the network is out of service. One way to ascertain a value of Dmin for PTP messages from each master end system 70, 76, 80, and 84 can be by allowing only one master end system 70, 76, 80, and 84 at a time to send PTP messages with no other traffic on the network and measuring the latency at each end system 70, 76, 80, 84, 90 and 94.

The network connections 20 can comprise any known methods of connecting nodes 70, 76, 80, 84, 90, and 94 on a communications network 10, such as wired and wireless methods. The network can have a mixture of various network connection types. For example, critical nodes may be connected via more reliable wired connections or both wired and wireless connections and less critical nodes may be connected by only wireless connections.

Figure 2:
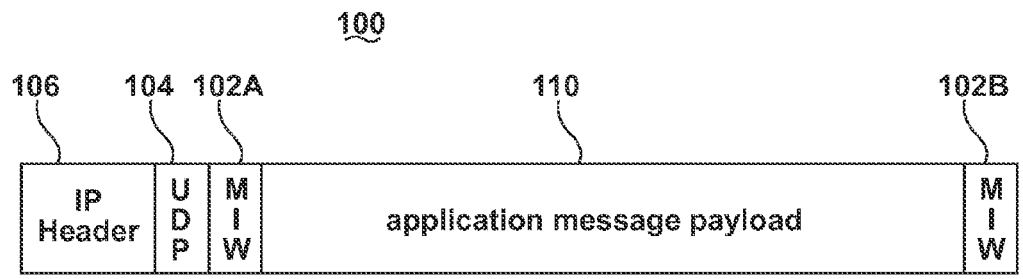
FIG. 2 is a schematic representation of a communications message transmitted over the network of FIG. 1.
Figure 3:
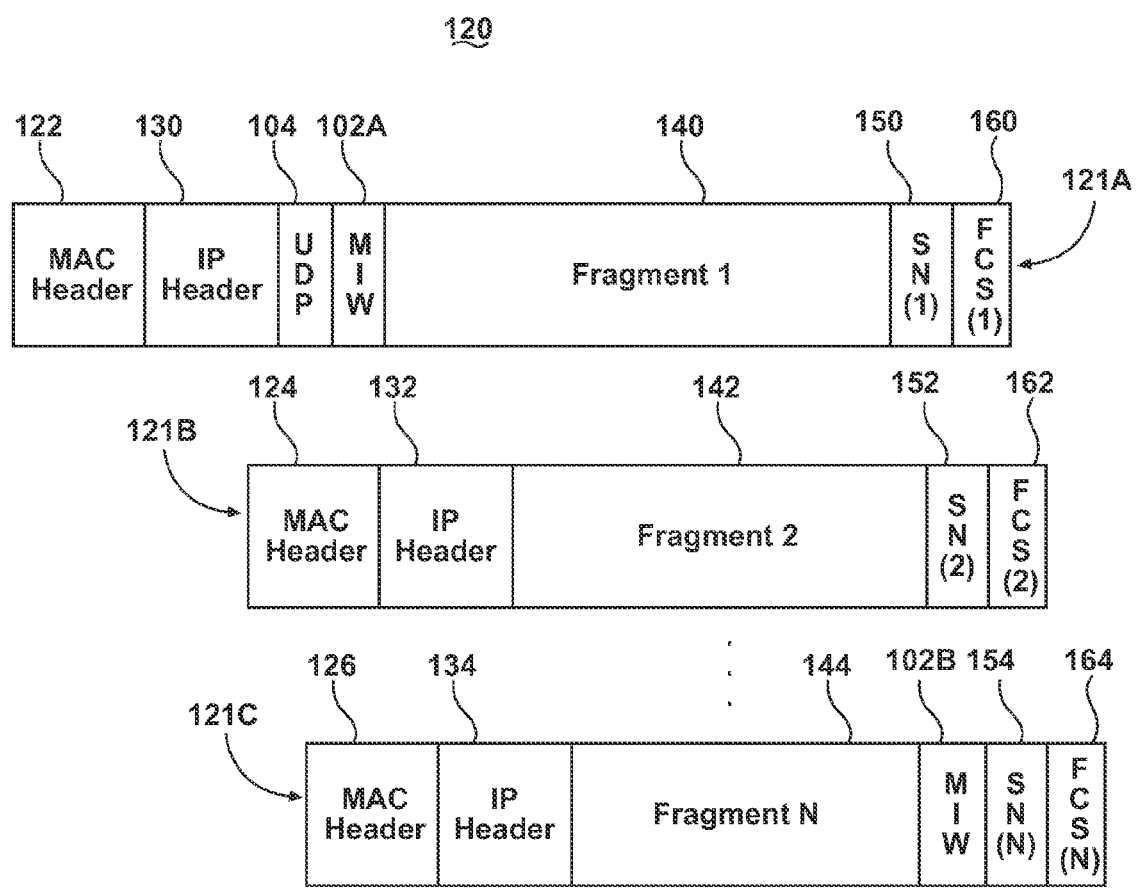
FIG. 3 is a schematic representation of a multiple fragments of the communications message of FIG. 2 to transmit over the network of FIG. 1.

Referring now to FIGS. 2 and 3, the network depicted in FIG. 1 can transmit communications message 100 comprising an application message payload 110 wrapped in a message integrity wrapper (MIW) 102A and 102B. The application message payload 110 is the substantive information sent from one node 70, 76, 80, 84, 90, and 94 to another node 70, 76, 80, 84, 90, and 94. For example, the message payload can comprise instructions sent from an aircraft master controller to a peripheral controller of the aircraft. The MIW 102A can contain time synchronization data such as a source time stamp (STS) and synchronization quality indicator (SQI). The MIW 102B can contain a cyclic redundancy check (CRC) computed over a domain which includes the MIW 102A and the application message payload 110. For security purposes, the computation of the CRC for MIW 102B can be initialized using a seed value which is known only to the transmitter and receivers configured to receive the application payload message 110. The communications packet can further comprise a user datagram protocol (UDP) header 104 and an internet protocol (IP) header 106. The UDP header 104 can comprise information pertaining to a source socket, a target socket, the message packet length, and a checksum to detect corruption of the message during transmission. The IP header 106 can comprise, among other elements, information related to the header length, type of service, datagram length, source IP address, and target IP address.

When the communications message 100 is a length that is too great to send as a single packet, the communications message 100 can be fragmented into multiple media access control (MAC) fragments 120, where there is a first fragment 121A, second fragment 121B, and any number of additional fragments including the last fragment 121C. Each fragment comprises an application message payload fragment 140, 142, and 144, a sequence number (SN) footer 150, 152, and 154, a frame check sequence (FCS) footer 160, 162, and 164, an IP header 130, 132, and 134, and a media access controller (MAC) header 122, 124, and 126. The application message payload fragments 140, 142, and 144 can be reconstructed at the receiving node to form the application message payload 110. The SN footer 150, 152, and 154 and FCS footer 160, 162, and 164 are used for reconstructing the application message payload 110. The IP header 130, 132, and 134 comprise, among other elements, checksum data and fragment information for each fragment 121A, 121B, and 121C, respectively. The MAC header 122, 124, and 126 comprises, among other elements, a source and destination addresses.

The MIW 102A and 102B in the MAC fragmented communication message 120 can still comprise STS information with a time stamp provided by the sending node when the first fragment 121A of the fragmented message 120 is transmitted from the sending node to the receiving node. The receiving node can extract the STS from the first fragment 121A and can record a LNT upon receipt of the last fragment 121C.

Figure 4:
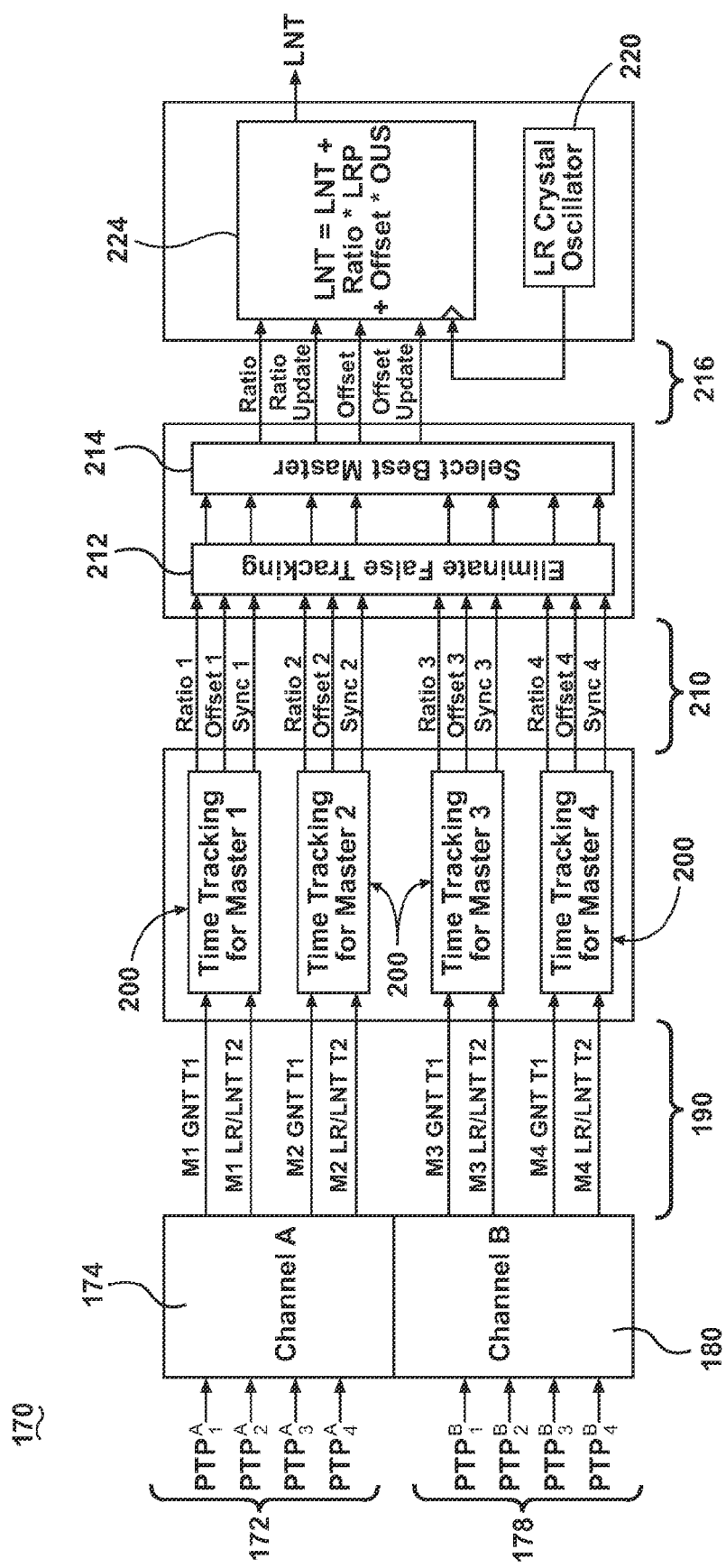
FIG. 4 is a flow chart depicting a method of synchronizing a local estimate of a global network clock at an end system of the network of FIG. 1 according to one embodiment of the present invention.

The method of time synchronization 170 of one of the end systems 70, 76, 80, 84, 90, and 94 to a master end system 70, 76, 80, and 84 is described in reference to FIG. 4. Two redundant precise time protocol (PTP) messages 172 and 178 are received at the end system 70, 76, 80, 84, 90, and 94 from each of multiple master end systems 70, 76, 80, and 84 on each channel 174 and 180. In other words, each of the master end systems 70, 76, 80, and 84 transmits PTP messages 172 on Channel A 174 and PTP messages 178 on Channel B 180 to be received by the end system 70, 76, 80, 84, 90, and 94 for which time synchronization is to be performed. The PTP messages received by the receiving node (the ES) on channel A are $PTP^A_1$, $PTP^A_2$, $PTP^A_3$, and $PTP^A_4$, corresponding to master end systems M1 70, M2 76, M3 80, and M4 84, respectively. Similarly, the PTP messages received by the receiving node (the ES) on channel B are $PTP^B_1$, $PTP^B_2$, $PTP^B_3$, and $PTP^B_4$, corresponding to master end systems M1 70, M2 76, M3 80, and M4 84, respectively.

The PTP messages from each sending node, or master end system on each channel are received repeatedly. Therefore, the PTP messages are transmitted by the sending nodes and received by the receiving nodes as a time series with a time period. For example, one PTP message may be received from each master end system for each channel every 100 mS, where the time series of received PTP messages has a time period of 100 mS. The time period is preferably between 25 mS and 250 mS, and more preferably between 50 mS and 150 mS, and most preferably 100 mS. If the time period is too long, then the method of time synchronization 170 takes relatively long time and if the time period is too short, then too much of the communication network 10 bandwidth and end system 70, 76, 84, 90, and 94 processing resources may be expended for time synchronization.

From the PTP messages received $PTP^A_1$, $PTP^A_2$, $PTP^A_3$, $PTP^A_4$, $PTP^B_1$, $PTP^B_2$, $PTP^B_3$, and $PTP^B_4$ at any given time period, one PTP message corresponding to each master end system is selected and timing information related to the selected PTP message is passed on at 190 to a time tracking process 200. In other words, at any given time period, only one of $PTP^A_1$ and $PTP^B_1$, one of $PTP^A_2$ and $PTP^B_2$, one of $PTP^A_3$ and $PTP^B_3$, and one of $PTP^A_4$ and $PTP^B_4$ are selected and related timing information is passed along to the next stage 190. Of the selected PTP message at any given time period and any given master end system 70, 76, 80, and 84, the GNT is extracted from the message and designated as T1, the time stamp at the ES of LNT based on the LR is designated as T2. T1, T2 and LR corresponding to each master end system at any given time period is passed to the time tracking process 200.

Each receiving end system 70, 76, 80, 84, 90, and 94 has multiple instances of the time tracking process 200. Each receiving end system 70, 76, 80, 84, 90, and 94 has one instance of time tracking process 200 for each master end system 70, 76, 80, and 84.

The time tracking process 200 associated with each master end system 70, 76. 80, and 84 receives a time series of data over several time periods. Upon receiving a required number of data points over several time periods, the time tracking process 200 provides a ratio (R) and an offset for the master end system on which the time tracking process 200 has been applied. When the time tracking process 200 meets configured time tracking criteria for a master end systems, a ratio, offset, and sync is generated for that master end system is provided via interface 210 to an "eliminate false tracking" process 212.

The primary purpose of the eliminate false tracking process 212 is to disqualify the tracking process 200 of a master whose estimate of GNT is outside of a preconfigured range from the plurality of the other masters. It is recognized that it is entirely possible, either by configuration of the network or by a coincidental failure of multiple master end systems, that no master is within a preconfigured range of the other masters. In such case, network time integrity cannot be achieved. For network time integrity to be achieved, there must be a plurality of master end systems whose estimate of GNT is within the preconfigured range.

The eliminate false tracking process 212 receives a ratio, offset and sync flag from each of the master end systems designated as Ratio 1, Offset 1 and Sync 1 from M1 70, Ratio 2, Offset 2 and Sync 2 from M2 76, Ratio 3, Offset 3 and Sync 3 from M3 80, and Ratio 4, Offset 4 and Sync 4 from M4 84.

The sync flag indicates that the tracking process 200 has met a configured tracking criteria. If at least one sync flag is true, the eliminate false tracking process 212 can use the sync flag to disqualify any ratio and offset for which the corresponding sync flag is false. If no sync flag is true, as should be the case upon initialization of the end system, the SQI in the MIW 102A will be used to indicate that the STS value in the MIW 102A is not reliable.

When no sync flag in 210 is true, time tracking has not been established but at least one of the ratio and offset pairs must be passed on at 216 to adjust the rate and offset used to compute LNT in the time synchronization process 224. This requires that LNT be adjusted even when no sync flag is true. Otherwise, a sync flag may never become true and adjustment of LNT would be blocked indefinitely as LNT tracking of GNT would never be established. Prior to declaring that LNT is synchronized to GNT, selection of the best ratio and offset can be based on criteria which is does not involve the state of the sync flags, for example, using the ratio and offset corresponding to median time offset value of all masters.

When the multiple time tracking processes 200 indicate they are synchronized to their respective master end systems, i.e., when multiple sync flags are true in 210, the eliminate false tracking process 212 can still eliminate any ratio and offset that is not consistent with the other ratios and offsets. For example, if it is found that one of the ratios is different from the mean of all of the ratios by a predetermined amount, then the ratio, as well as the offset corresponding to that ratio can be eliminated. Similarly, if it is found that one of the offsets is different from the mean of all of the offsets by a predetermined amount, then that offset, as well as the ratio corresponding to that offset can be eliminated. As an alternative example, if it is found that one of the ratios is greater than a predetermined amount or is less than another predetermined amount, then that ratio, as well as the corresponding offset can be eliminated. Similarly, if it is found that one of the offsets is greater than a predetermined amount or is less than another predetermined amount, then that offset, as well as the corresponding ratio can be eliminated. The additional checks by the eliminate false tracking process 212 can be used to ascertain the integrity of the sync flag in case the value of ratio and offset being presented at interface 210 is inconsistent with the sync flag being true. This consistency check of the sync flag by the eliminate false tracking process 212 serves to protect against a false declaration that synchronization has been achieved by the LNT time tracking process 200 due to a malfunction within the time tracking process 200.

The time tracking process 200 of each of the master and systems 70, 76, 80, and 84 may not provide a ratio and offset to the eliminate false tracking process 212 contemporaneously. Therefore, the eliminate false tracking process 212 must have a policy regarding the partial or complete reception of the ratios and offsets expected from all of the master end systems 70, 76, 80, 84 before eliminating any of the ratios and offsets based upon average ratios and offsets or based upon comparison to predetermined allowable limits. The eliminate false tracking process 212 provides a time-aligned set of alternative rate and offset adjustments for the select the best master process 214.

When multiple sync flags are true, the ratios and offsets that are deemed to be valid by the eliminate false tracking process 212 are provided to a select best master process 214. These ratios and offsets thus passed from process 212 to process 214 represent the time tracking processes 200 that are qualified as being synchronized to GNT.

The select the best master process 214 can select the ratio and offset corresponding to a preconfigured decision tree for those masters for which the sync flag is both true and for which the rate and offset are in a range consistent with the sync flag being true.

For example, the select best master process 214 can use a priority-based selection method. Using this approach, the select the best master process 214 considers the priority of each of the master and systems 70, 76, 80, and 84 and selects the ratio and offset corresponding to the highest priority master end system 70, 76, 80, and 84, and passes that ratio and offset 216 for time synchronization 224. For example, if none of the ratios and offsets were eliminated in the false tracking process 212 and if M1 70 has the highest priority relative to the other master end systems 76, 80, and 84, then the ratio and offset corresponding to M1 70 are selected by the select best master process 214 and are passed via interface 216 for time synchronization 224. On the other hand, if M1 70 has the highest priority and M3 80 has the second highest priority relative to the other master end systems 76 and 84, but the ratio and offset corresponding to M1 70 were eliminated in the eliminate false tracking process 212, then the ratio and offset corresponding to M3 80 are passed 216 to synchronize the LNT 224.

As an alternate approach, the select the best master process 214 may use a selection process that does not depend on priority. For example, the process 214 may choose the median value of rate and offset of the outputs of time tracking processes 200 that are qualified as being synchronized by process 212. As a further alternative, select best master process 214 may select the rate and offset from the tracking processes 200 associated with those masters whose PTP messages was most recently received since the last iteration of the select best master process 214.

As yet a further alternative approach, the select the best master process 214 may use a calculation involving the set of rates and offsets it receives from process 212, such as a weighted average or a prediction based on an ensemble of past values it received from process 212.

Once a ratio and offset are output at 216 by the select best master process 214, the selected ratio and offset 216 are used to synchronize LNT 224. For example, the rate of LNT advance can be determined by continuously accumulating the ratio output at 216 at a rate determined by a local reference (LR) clock. In this way, the time advanced in one PTP cycle is the number of local reference periods per PTP cycle (LRP) multiplied by the ratio at 216 summed with the offset at 216. To track GNT, the ratio is added to the LNT every period of the LR clock. The offset output at 216, on the other hand, is added only once to this accumulator to instantaneously align the LNT to the GNT. For simplicity of notation in FIG. 4, this calculation is depicted as LNT=LNT+LRP*Ratio+Offset*OUS, where OUS=1 for only one LR clock cycle when an updated offset becomes available and OUS=0 otherwise. The method 170 then provides an LNT that is synchronized to GNT.

As an additional feature, when the time synchronization method 170 is executed, a synchronization quality level may be set to indicate the accuracy of time synchronization for that ES. Therefore, a time synchronization level may exist for each of the ES. This synchronization level can be included in the MIW 102A of high integrity messages and may be used for validating incoming messages to an ES to determine if the LNT of the receiving node has been synchronized and therefore can be trusted.

Figure 5:
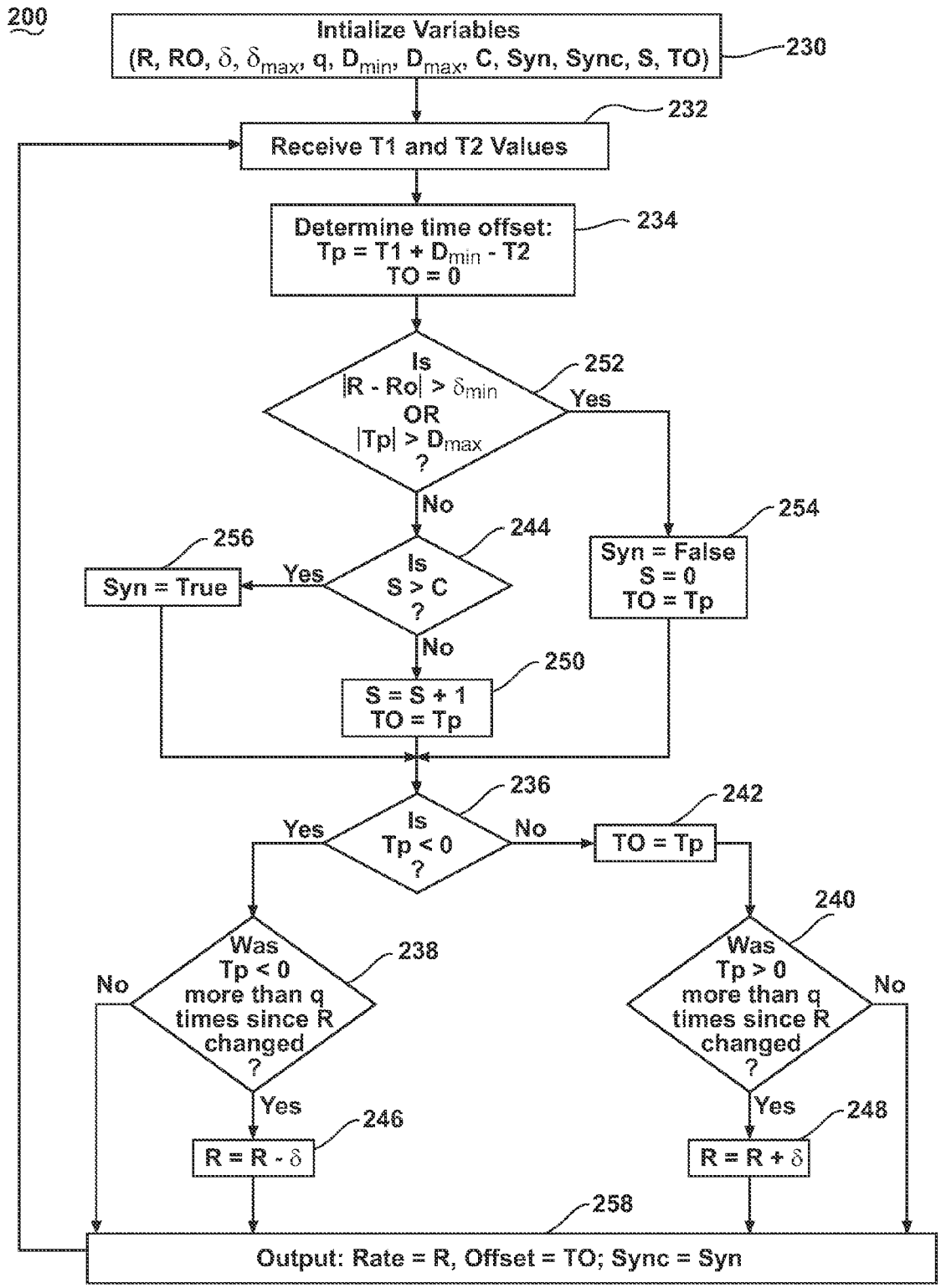
FIG. 5 is a flow chart depicting a method of time tracking of each master end system to implement the method depicted in FIG. 4.

Each of the time tracking processes 200 to track GNT using the PTP messages received from the master end system of method 170 is described in greater detail in reference to FIG. 5.

As indicated in FIG. 5, variables R, Ro, $\delta$, $\delta_{max}$, q, Dmin, Dmax, C, Syn, Sync, S, and TO associated with the time tracking process 200 are initialized at 230. R is an estimate of the ratio of the local clock rate advancement relative to the master being tracked by the instance of process 200 associated with that master. Ro is the initial value of R. $\delta$ is the fraction by which R is incremented or decremented to adjust the rate. q is the number of consecutive PTP periods during which an increase or decrease in R must be detected before R is changed. Dmin is the estimated or measured minimum PTP message technological transfer latency for the master associated with the instance of process 200 at a receiving end system. The actual PTP message transfer delay is necessarily always greater or equal to Dmin. Dmax is the absolute maximum calculated offset between LNT and GNT that process 200 will tolerate before declaring that it is no longer synchronized to the master end system that it is tracking. Note that the calculation of offset will include an error which includes any PTP message transfer latency in excess of Dmin. Thus, its value must be chosen so that the maximum acceptable transfer latency of a PTP message does not force a loss of synchronization. For example, Dmax may be chosen to be no longer than Dmin plus the period between PTP messages. $\delta_{max}$ is the maximum deviation of the ratio R from its initial value Ro allowed for process 200 to remain synchronized. S counts the number of consecutive times that the process 200 determines the offset between LNT and GNT to be within Dmax. C is the number of times S must be within Dmax for process 200 to become synchronized and set its syn flag true. The sync flag that is output by process 200 is set to syn upon completion of a processing cycle. TO is the offset that is output by process 200 upon completion of a processing cycle and represents an estimate by which the offset used by 224 to compute LNT is modified to reduce the difference between LNT and GNT.

T1 and T2 values for the master end system 70, 76, 80, and 84 for the current time period are received at 232. T1 is the value of GNT placed into the PTP message by the master end system 70, 76, 80, and 84. T2 is the value of LNT at ES 70, 76, 80, 84, 90 and 94, sampled when a PTP message arrives from the master ES 70, 76, 80, and 84, which provides a time stamp for the arrival of the PTP message. The LNT can be determined in 224 by accumulating the selected ratio, R, at a clock frequency determined by the local reference (LR) clock following a one-time adjustment of the accumulator by the value of the offset, TO, selected during the previous PTP cycle.

The estimate of the time offset of the most recent PTP message from the associated master end system, Tp, is determined at 234. Tp is calculated as Tp=T1+Dmin−T2. Next, it is determined at 252 if the absolute value of Tp is within the maximum delay allowed for a PTP message (|tp|>Dmax). Concurrently, it is determined at 252 if the absolute value by which R has deviated from its initial value, Ro. is greater than $\delta_{max}$. If the absolute value of Tp is greater than Dmax or if the absolute value of R−Ro is greater than $\delta_{max}$, Syn is set to false at 254. If Tp is determined to be less than 0 at 236 and is determined to remain less than zero for more than q samples at 238, then R is reduced by $\delta$ at 246. If however, Tp is determined to be less than 0 at 236, but not for q time samples since the last change in R at 238, then method 200 returns back to 232. On the other hand, if Tp is greater than 0 at 236, then TO is set to Tp at 242, corresponding to a positive advancement of LNT at 224. If Tp is greater than 0 for q samples at 240, R is increased at 248. The resulting values of R, TO and Sync=Syn are then output on interface 210 at 258.

It can be seen that the order of the steps of process 200 can be changed without detracting from the inventive element of the process 200. Additionally, intervening steps may be added to the process 200 without detracting from the inventive element of the process 200.

Process 200 uses the value of GNT placed into a PTP message by the master at the time it is sent together with a previously determined value for Dmin. The tracking algorithm relies on configuring the network so that there is a negligible probability of not receiving PTP messages with a latency close to Dmin before the absolute difference between LNT and GNT exceeds Dmax. When process 200 generates a rate and offset that are within configured limits, as defined by $\delta_{max}$ and Dmax, for a configured contiguous time interval defined by C, it indicates it is synchronized to GNT. Process 200 indicates that it is synchronized using its sync flag output. A key feature of process 200 is that it will not advertise a negative time offset at interface 210 while it is synchronized.

The process 200 provides a value of R and an offset TO for each master end system 70, 76, 80, 84 based upon a time series of timing information from PTP messages over several time periods. The value of R is used to modify the rate of advancement of the LNT when it is found that the clock frequency of the LR at ES is different from the frequency of the GNT. In other words, R provides a correction to the relationship between the clock rate of the GNT and LR On the other hand, the offset provides an instantaneous adustment to match the LNT to the GNT.

The initialization of values R, Ro, $\delta$, $\delta_{max}$, q, Dmin, Dmax, C. Syn, S. and TO may be determined heuristically or by an algorithm. For example, the value of R=Ro can be initialized to 1, such that, nominally, it is assumed that the frequency of the LNT and thereby the LR of the local node ES is matched to the frequency of the GNT provided by the master end system. If the frequency of the LR of the ES is greater than the frequency of the GNT from the master end system, then method 200 provides a value of R less than 1, so that the rate of time advancement for LNT of the slave ES can be matched to that of the GNT from the master end system.

The value q can be initialized to 3 and can be modified over time based upon the performance of the process 200. In general, if the value of q is set too high, then more time periods will be required to synchronize the LNT of the local ES, thereby taking longer to perform the synchronization. However, if the value of q is set too low then the process 200 may not provide a value of R that can reliably achieve time synchronization. In one aspect, the required value of q may vary for different communications networks 10 and number and type of ES on the communication network 10.

The value of $\delta$ may be initialized to a multiple of the clock drift over a short time interval on the order of several seconds or minutes. For example, $\delta$ may be initialized to 10% of the clock drift. As a further alternative, $\delta$ may be initialized to a multiple of the clock drift where the multiple depends on whether the ES is starting up and requires an initial synchronization or if ES has already been synchronized. Continuing with this example, if the ES is in startup mode and requires an initial synchronization, $\delta$ may be set at 100% of the short-term drift, while if the ES is to be resynchronized, then $\delta$ may be set at 10% of drift.

The value of $\delta_{max}$ depends on the maximum tolerated deviation of LR clock rates within the network over the service life of the network. For example, the value of $\delta_{max}$ takes into account the effect of temperature and age on the frequency of a crystal clock oscillator used as a reference for LNT The clock drift, $\delta_{max}$, is a specification provided for an oscillator used to generate the LR at each node. The specification may be provided by the manufacturer of the oscillator. Typically the drift specification is reported as a multiple of the clock frequency. For example, an oscillator may have a drift specification of 25 ppm. In such a case, if the clock frequency is 100 MHz, then the drift of the clock can be +/−2.5 kHz. In some cases, the drift specification may have a time degradation associated therewith. For example, an oscillator may have a drift specification of 25 ppm+/−10 ppm/year. In such a case, $\delta_{max}$ as well as $\delta$ used in method 200 may vary with the age of the communications network 10.

The technological minimum latency, Dmin, represents the minimum time possible for a message to be sent from the master end system considered in method 200 to the ES. This Dmin may be a function of the distance between the master end system and the ES and the switching time of each of the switches that are involved in the transmission of the message. The technological minimum latency for forwarding a frame in an uncongested switch is typically less than 100 μS. Link transmission times will vary with the transmission rate of network connections 20. For example, a PTP packet occupying a 64 byte MAC frame will be transmitted in 67.2 μS on a 10 Mbps connection, 6.72 μS on a 100 Mbps connection, or 672 nS on a 1 Gbps connection.

To properly use time integrity check, uncompensated drift of each node's local network time reference (LNT) must be less than the minimum technological latency (Dmin) between any pair of nodes. Therefore, time synchronization method 170 can be repeated periodically to ensure that drift between any two nodes do not exceed Dmin while the communications network 10 is operational, and especially when time integrity check is being implemented. Dmin may be as low as 100 μS and, therefore, in such a case the time tracking skew between two nodes should be at most 50 μS to not experience time integrity check failures. For data transfers between non-PTP host applications 70, 76, 80, 84, 90, and 94, Dmin may be between 100 μS and 100 ms. The LNT resolution must be less than the frame transmission time between nodes. For example, the required resolution can be as low as 672 nS when using 1 Gbps network connections 20. The nodes must be synchronized for the maximum amount of time that the aircraft can be powered up. This is typically no more than 10 days, but could be as many as 30 days. Therefore, the node time synchronization method 170 must use a network time stamp resolution of less than 672 nS, with 100 nS being preferred.

Additionally, when tracking method 200 is synchronized as indicated by method 200 setting its Sync output true on interface 210, its rate and offset can only increase LNT monotonically. This is because if Tp<0 at 236 of method 200 and Syn is true, TO=0 because it remains unmodified from its value set in 234. Therefore, if Tp<0 and Syn=True, only a rate adjustment can be made. On the other hand, if Syn=ture and Tp≥0, then TO=Tp at 242. Method 200 can only make a negative time adjustment, if it is not synchronized, i.e., if Sync=False. If all tracking processes 200 declare Sync=false, this indication will propagate to a flag bit in the MIW 102A that LNT is not synchronized to GNT and that the time value in MIW 102A is not reliable. Therefore, the method of time synchronization 170 is not synchronized whenever LNT is decreased.

Additionally, the nodes must be able to remain synchronized for the maximum amount of time that the aircraft can be powered up to prevent LNT from reverting to zero. This is typically no more than 10 days, but could be as many as 30 days. Therefore, the method of time synchronization 170 must accommodate synchronization of the network 10 for such extended periods of time using a minimum time stamp size or 48 bits when the resolution is 100 nS.

Figure 6:
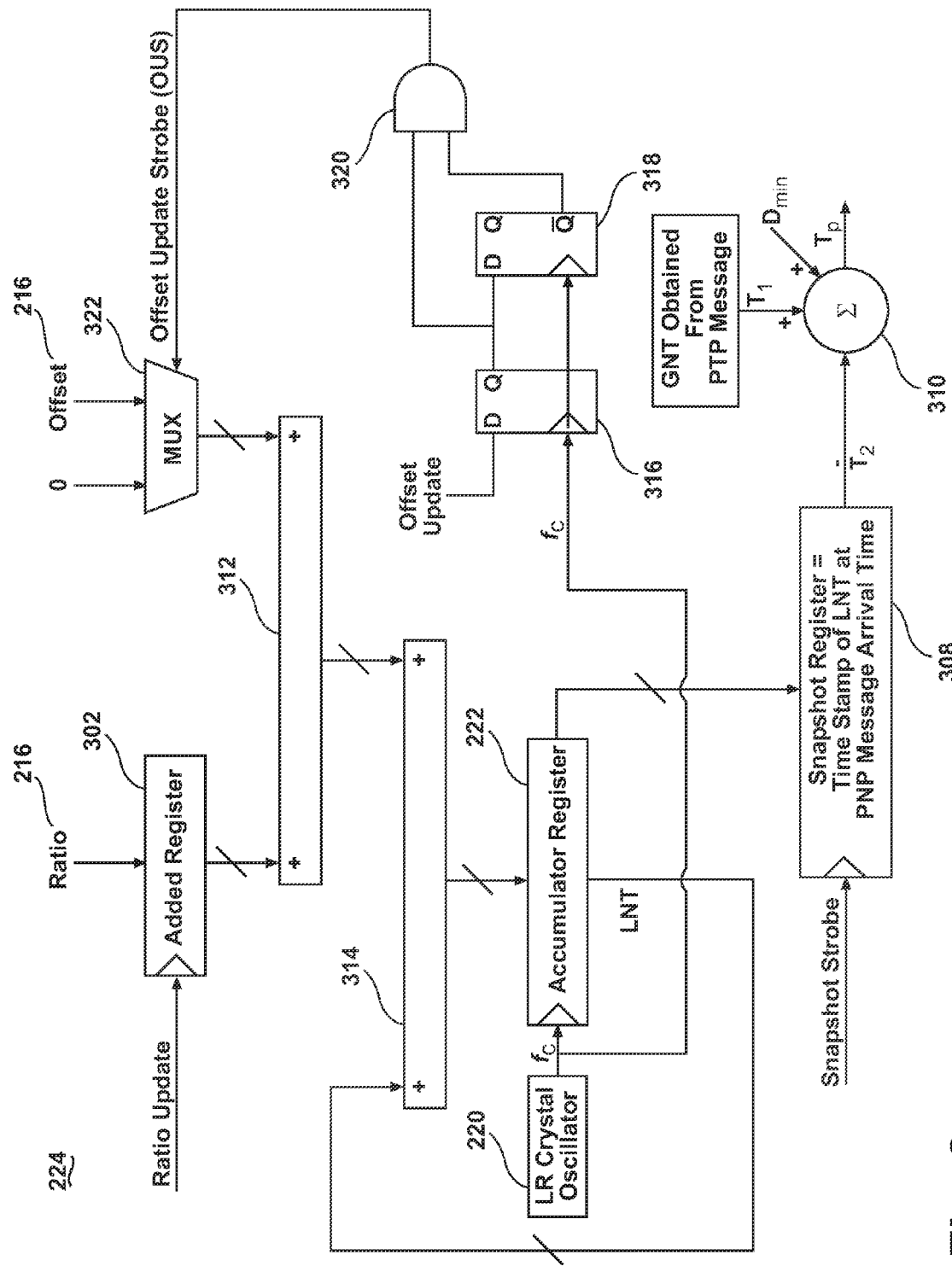
FIG. 6. is a schematic depicting one method of adjusting a local time reference by a ratio and an offset to synchronize it to a global network time reference.

The calculation of LNT 224 of method 170 is described in greater detail in reference to FIG. 6.

LNT is the output of an accumulator register 222 which is clocked by local reference crystal oscillator (LRCO) 220. Register 302 contains the most recent update of the ratio from interface 216. The LRCO 220 outputs a clock with frequency fc and period Tc=1/fc. During normal operation, an Offset Update Strobe is not active and the output of multiplexer 322 is zero. At the start of each clock period Tc, the accumulator register 222 samples and outputs the sum of LNT and the output of the Ratio Register 302, as determined by the adders 312 and 314. The ratio in 302 represents the number of time unit intervals advanced during each period Tc. For example, if a unit time interval of 100 nanoseconds were chosen and if fc=1 megaHertz, then a ratio value of 10 would represent an advance 10 times 100 nanoseconds or, equivalently, 1 microseconds for every period Tc. Alternatively, if a unit time interval of 1 microsecond were chosen and if fc=1 megaHertz, then a ratio value of 1 would represent an advance of one microsecond. It should be understood that the output of the ratio register and the accumulator register 222 have a sufficient number of bits to represent both an integer and fraction of a unit time interval. For example, if the accumulator register 222 were 64 bits wide, its 48 most significant bits can be used to represent the value of LNT in microseconds, while the 16 least significant bits of both registers 222 and 302 can represent fractions of a microsecond, and thereby provide the means to adjust the rate in fractions of a microsecond per cycle of fc, based on R.

Continuing with FIG. 6, the LNT is advanced by the offset presented on interface 216 by adding this offset to the output of the accumulator during one clock cycle following Offset Update becoming active. Thereafter, the accumulator is advanced only by the ratio value contained in the addend register 302 until the next update becomes available on interface 216. This is because registers 316 and 318 with and gate 320 generate an offset update strobe (OUS) which controls the multiplexer 322 to ensure that the offset is not added to the contents of the accumulator for more than one cycle of fc. A snapshot strobe causes register 308 to sample the value of LNT when a PTP message arrives. Summer 310 computes the value of T2 as indicated within 234 of process 200.

Figure 7:
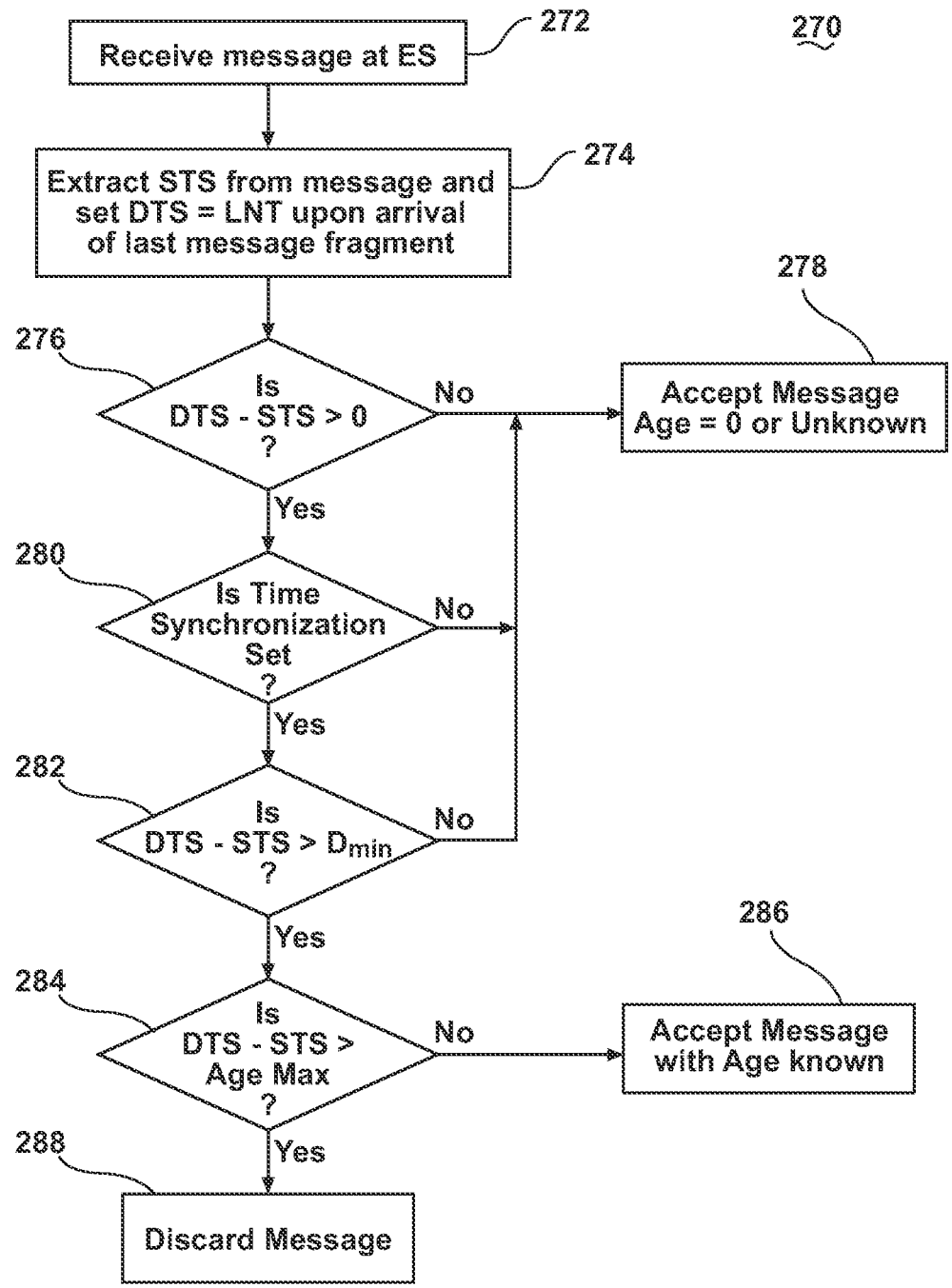
FIG. 7 is a flow chart depicting a method of sorting messages received at an end system according to one embodiment of the present invention.

It is understood that there are multiple alternative embodiments to FIG. 6 which can enable LNT to track GNT using the rate and offset provided on interface 216. For example, the functions depicted in FIG. 6 may be implemented in hardware or software or any combination of both. Referring now to FIG. 7, a method of sorting communications messages 270 based upon a source time stamp (STS) of the communication message 100 and a destination time stamp (DTS) of the final fragment of the communication message 100 is disclosed. The communication message is received at the end system at 272. Upon receipt of the last MAC fragment 121C of the message 100 the DTS is set to the LNT generated using the LR at the end system and the STS is extracted from the first fragment 121A of the message 100 at 274. It is then determined if the DTS minus STS is greater than zero (DTS−STS>0) at 276. If DTS−STS>0 is not true, then the message is accepted but indicated with an unknown Age of the message at 278, where the Age is equal to DTS minus STS (DTS−STS). If at 276 it is determined that DTS−STS is greater than zero, then it is determined if time synchronization has been set for the receiving node at 280. In other words, it is determined if the method time synchronization 200 was performed for the receiving node such that the LNT of the receiving node is synchronized with the GNT of a master end system 70, 76, 80, and 84. If at 280 it is found that the time synchronization has not been set them the method accepts the message within unknown age at 278. If, however, it is found that the time synchronization has been set at 280, then it is determined if the DTS minus the STS is greater than the technological minimum latency, Dmin at 282. If DTS minus the STS is not greater than Dmin at 282 then again the messages excepted with unknown age at 278. If, however, it is found that the DTS minus STS is greater than Dmin, then it is determined if the DTS minus STS is greater than Age Max (DTS−STS>Age Max) at 284. If it is, then the message is discarded at 288 and if it is not, then the message is accepted with a known Age at 286.

Age Max is a user specified predetermined threshold unique to each type of message that is used to discard messages that are too old and therefore may be invalid or may no longer be relevant. Age Max may between 1 mS and 10 Seconds.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of synchronizing a local estimation of global network time of a receiving node on a network to a global network time reference (GNT) of one of at least first and second sending nodes on the network comprising the steps of:

transmitting from each first and second sending node a first precise time protocol synchronization message (PTP message) on a first channel and a second precise time protocol synchronization message (PTP message) on a second channel to the receiving node, each PTP message having time data related to the GNT set by the respective sending node;

selecting one of the first and second PTP messages from each sending node and setting time data related to a local network time (LNT) by the receiving node corresponding to each selected PTP message;

extracting the time data, including GNT and LNT values, for the sending node and the receiving node for each selected PTP message;

determining a ratio of the LNT to GNT values, and an offset between LNT and GNT based on the time data and corresponding to each of the first and second sending nodes;

comparing the determined ratios and offsets to a predetermined criterion;

selecting one of the first and second sending nodes based on the comparison; and synchronizing the LNT to the GNT of the selected sending node.

2. The method of claim 1 wherein the PTP message transmitting, PTP message selecting, and time data extracting are repeated over a time series of time segments.

3. The method of claim 2 wherein the receiving node selecting one of the first and second PTP messages from each of the first and second sending nodes further comprises selecting the one of the first and second corresponding PTP messages that arrives at the receiving node first for each time segment of the time series of PTP messages.

4. The method of claim 2 wherein the time segment of the time series of the first and second PTP message of each of the first and second sending nodes is the period of the time series during which one of the first PTP message and one of the second PTP message is received by the receiving node.

5. The method of claim 4 wherein the time segment is between 125 milliseconds and 500 milliseconds.

6. The method of claim 2 wherein determining a time series of GNT is based upon a source time stamp (STS) of each of the PTP messages of the time series of selected PTP message.

7. The method of claim 2 wherein determining the ratio and the offset corresponding to each of the first and second sending nodes comprises the steps of:
   A. initializing current and initial ratios (R and Ro) of LNT to GNT for a time offset (TO), a scale adjustment factor ($\delta$), a ratio deviation limit ($\delta$max), a sample threshold (q), a minimum technological PTP message transfer latency (Dmin), a maximum permissible PTP message delay (Dmax), a count of the number of times TO is within a configured synchronization range (S), a synchronization threshold (C), and the synchronization flags (Syn and Sync);
   B. receiving the GNT value corresponding to a current time period (T1) and receiving the LNT value corresponding to the current time period (T2);
   C. determining a value of the present time offset (Tp) by subtracting T2 from the sum of T1 and Dmin. (Tp=T1+Dmin−T2); determining if one of the absolute value of the difference between the current ratio (R) and the initial ratio (Ro) is greater than the maximum allowed deviation of the ratio (|R−Ro|>$\delta$max) and the absolute value of Tp is greater than Dmax, and if not then proceeding to step E;
   D. setting TO to the value calculated for Tp (TO=Tp), Syn=False, and S=0, and then proceeding to step H;
   E. determining if S is greater than C (S>C) and if S is greater than C, then proceeding to step G;
   F. incrementing S and setting offset TO equal to offset Tp and then proceeding to step H;
   G. setting Syn=true;
   H. determining if Tp is less than 0 and if Tp is not less than 0, then proceeding to step K;
   I. determining if Tp was negative for q time periods since the last time R was adjusted and if not, then proceeding to step M;
   J. setting R=R−$\delta$, then proceeding to step N;
   K. setting TO=Tp;
   L. determining if Tp was positive for q time periods since the last time R was adjusted and if not, then proceeding to step N;
   M. setting R=R+$\delta$;
   N. setting output Rate=R, offset=TO, and Sync=Syn, and then returning to step B.

8. The method of claim 7 wherein initializing the R comprises setting R to a number of local reference clock cycles which equal a user defined unit time interval and initializing the offset comprises setting the offset to zero (TO=0).

9. The method of claim 7 wherein the maximum allowed deviation of R from its initial value is a user defined value $\delta$max.

10. The method of claim 7 wherein the q is a user defined parameter.

11. The method of claim 7 wherein $\delta$ is a user defined fraction of R.

12. The method of claim 1 wherein the first PTP message and the second PTP message are transmitted by the respective sending node concurrently.

13. The method of claim 1 wherein the time data further includes recording the local network time (LNT) upon arrival of the selected PTP message.

14. The method of claim 13 wherein the synchronizing the LNT to the GNT of the selected ratio and offset further comprises adding the selected ratio multiplied by the LR clock to LNT at every period of the LR clock and adding the selected offset to the LNT after the selected offset becomes available (LNT=LNT+Ratio*LRP+Offset*OUS).

15. The method of claim 1 wherein selecting one of the first and second sending node further comprises eliminating any sending node with a ratio that deviates from an expected ratio of the sending nodes by a first predetermined value and eliminating any sending node with an offset that deviates from an expected offset of the sending nodes by a second predetermined value.

16. The method of claim 1 wherein selecting one of first and second sending nodes comprises each of the first and second sending nodes having a priority associated therewith and selecting the first and second sending node having the highest priority.

* * * * *